G. W. SWIFT, Jr.
MECHANISM FOR MAKING PAPER RECEPTACLES.
APPLICATION FILED SEPT. 21, 1911.
1,064,563.
Patented June 10, 1913.
13 SHEETS—SHEET 1.
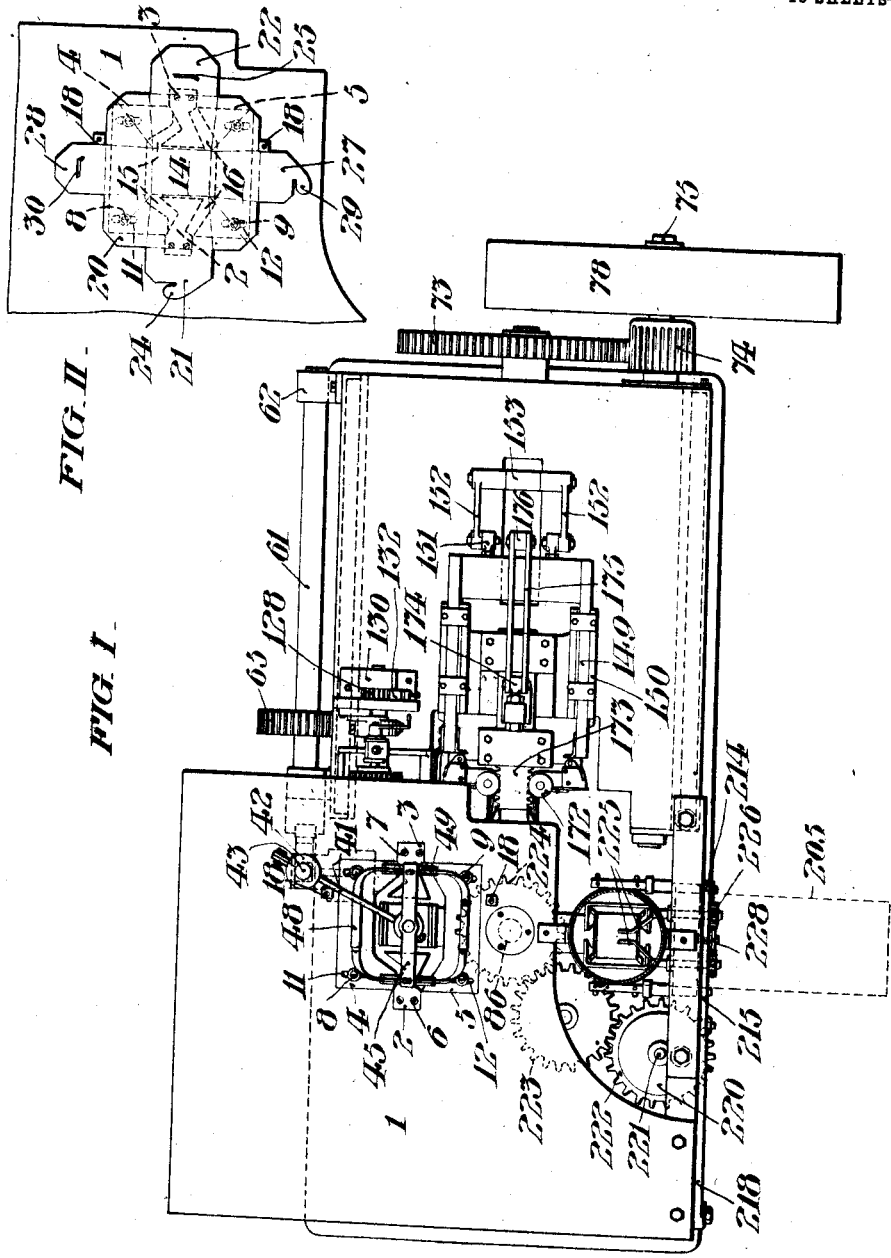
WITNESSES:
Philip W. Vessey.
James McCaley
INVENTOR:
George W Swift Jr

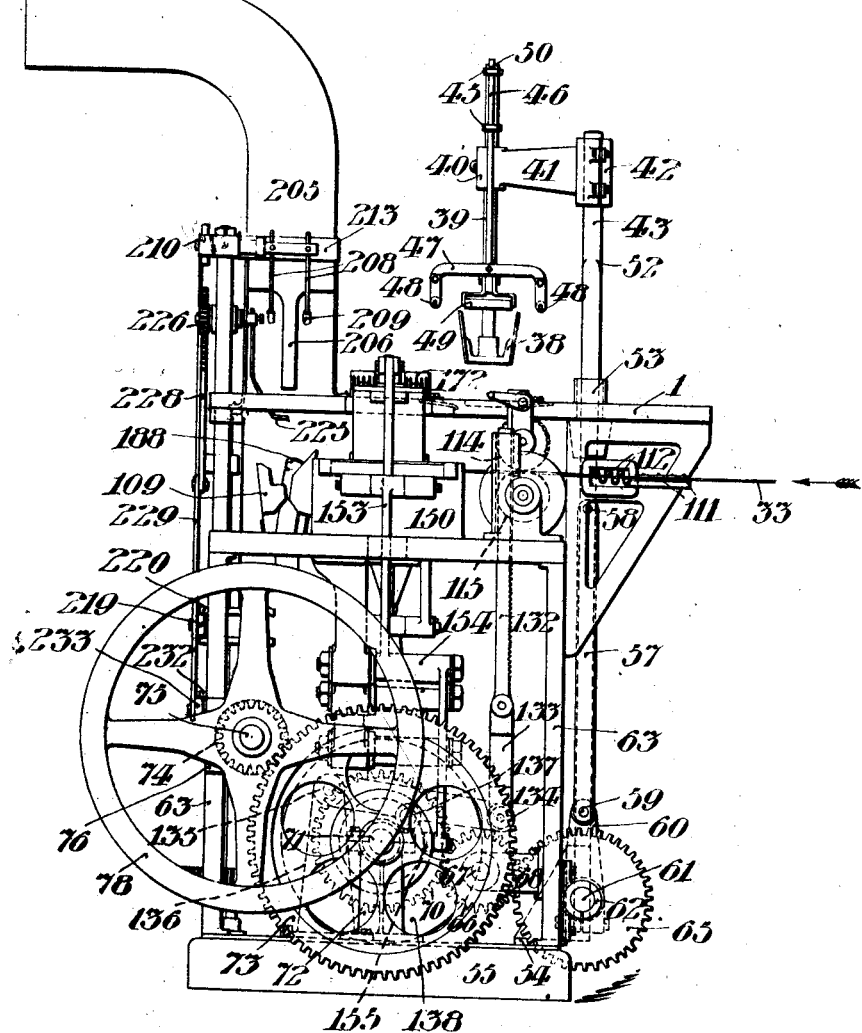

G. W. SWIFT, Jr.
MECHANISM FOR MAKING PAPER RECEPTACLES.
APPLICATION FILED SEPT. 21, 1911.
1,064,563.
Patented June 10, 1913.
13 SHEETS—SHEET 3.
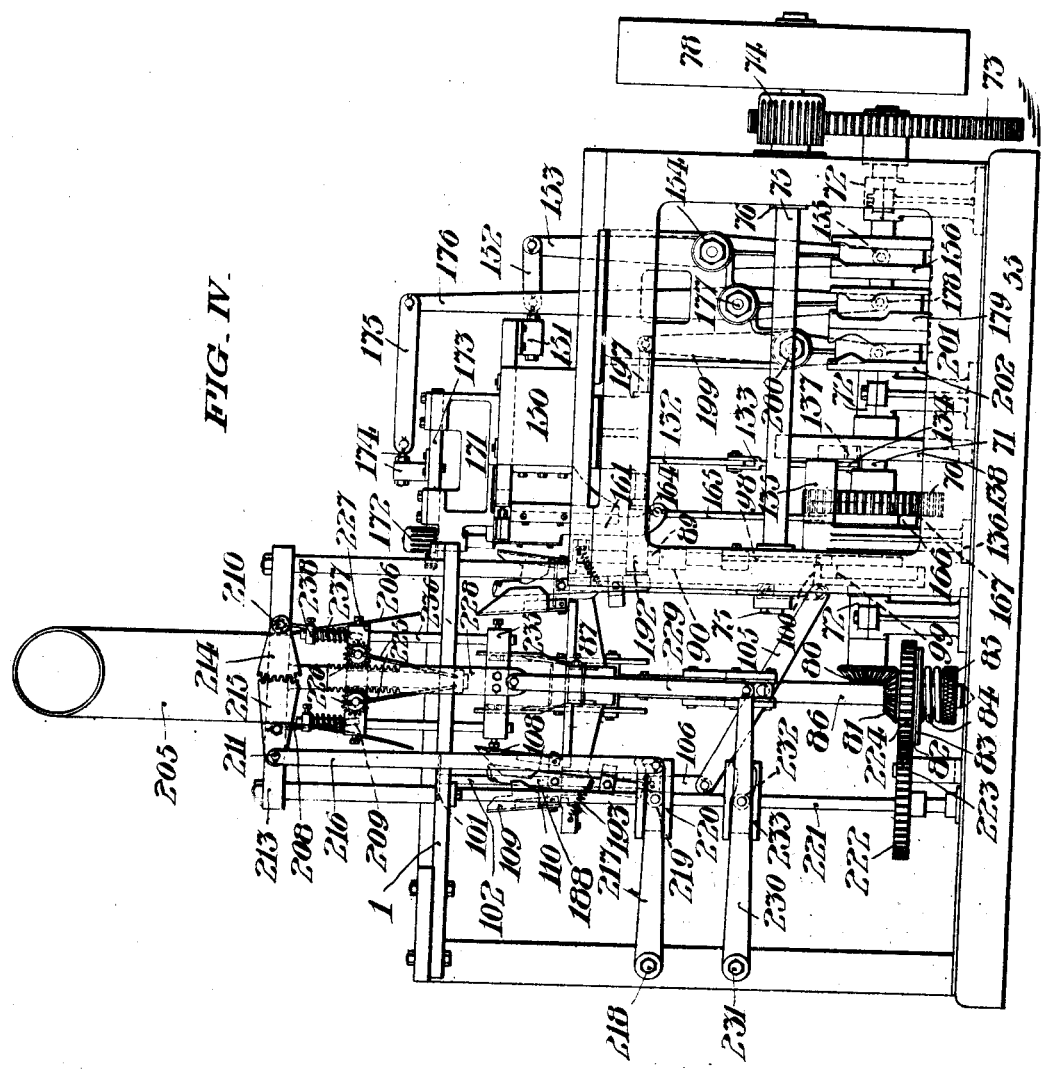
FIG. IV.
WITNESSES:
Philip W. Vessey
James M. Cole
INVENTOR:
George W. Swift Jr.
by Arthur E. Paige
Attorney.

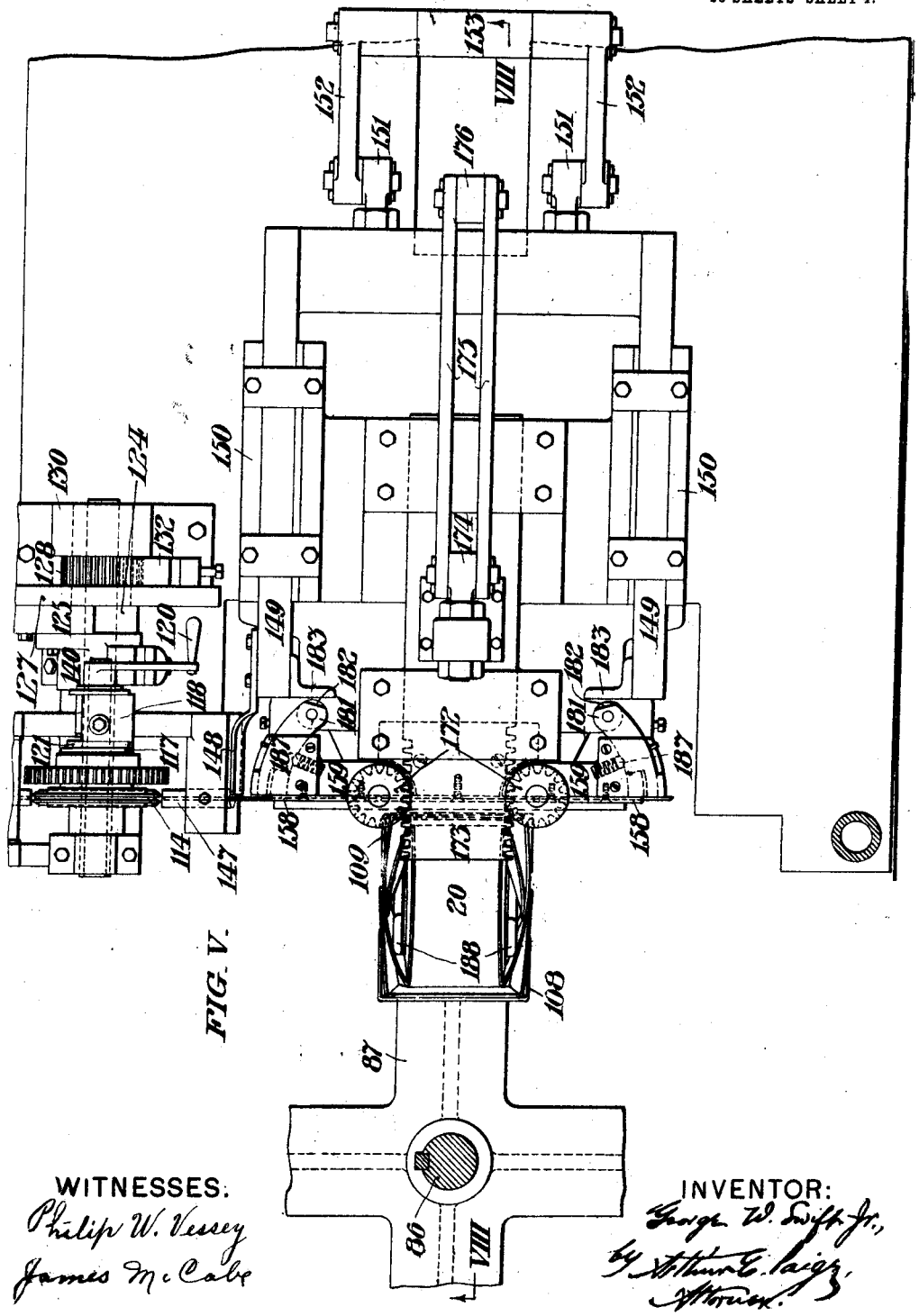

G. W. SWIFT, Jr.
MECHANISM FOR MAKING PAPER RECEPTACLES.
APPLICATION FILED SEPT. 21, 1911.
1,064,563.
Patented June 10, 1913.
13 SHEETS—SHEET 5.
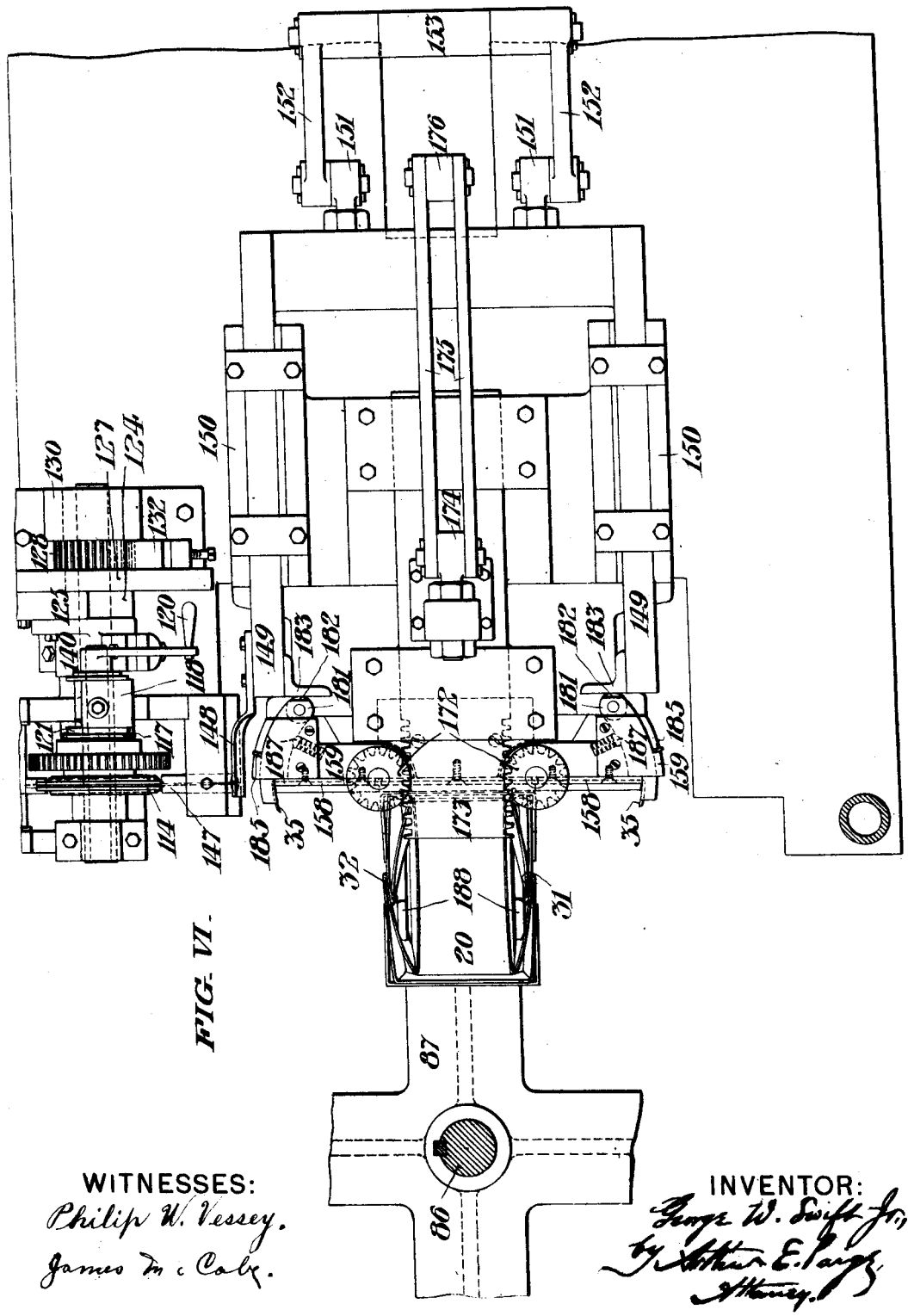
FIG. VI.
WITNESSES:
Philip W. Vessey.
James M. Cole.
INVENTOR:
George W. Swift Jr.
by Arthur E. Paige
Attorney.

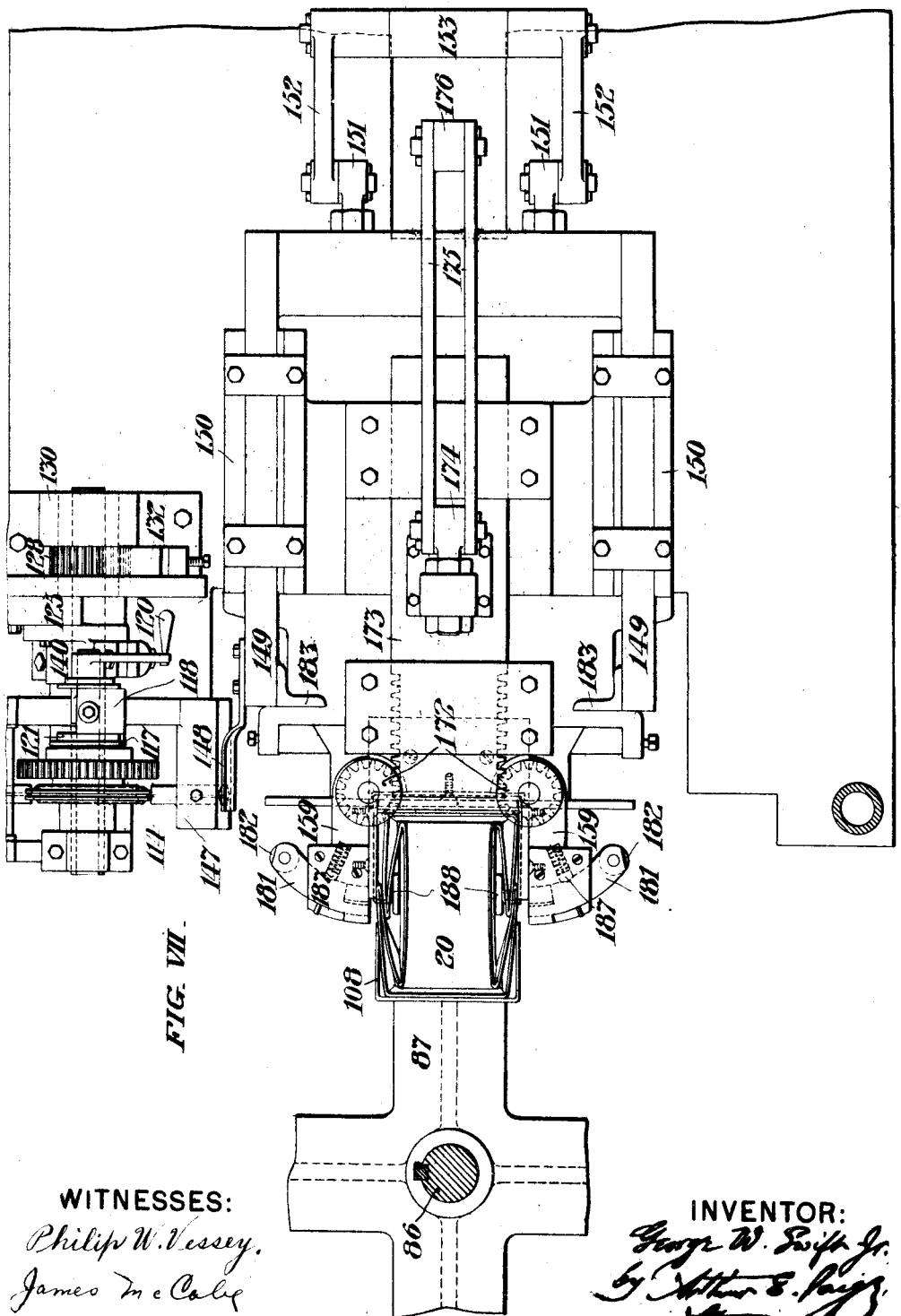

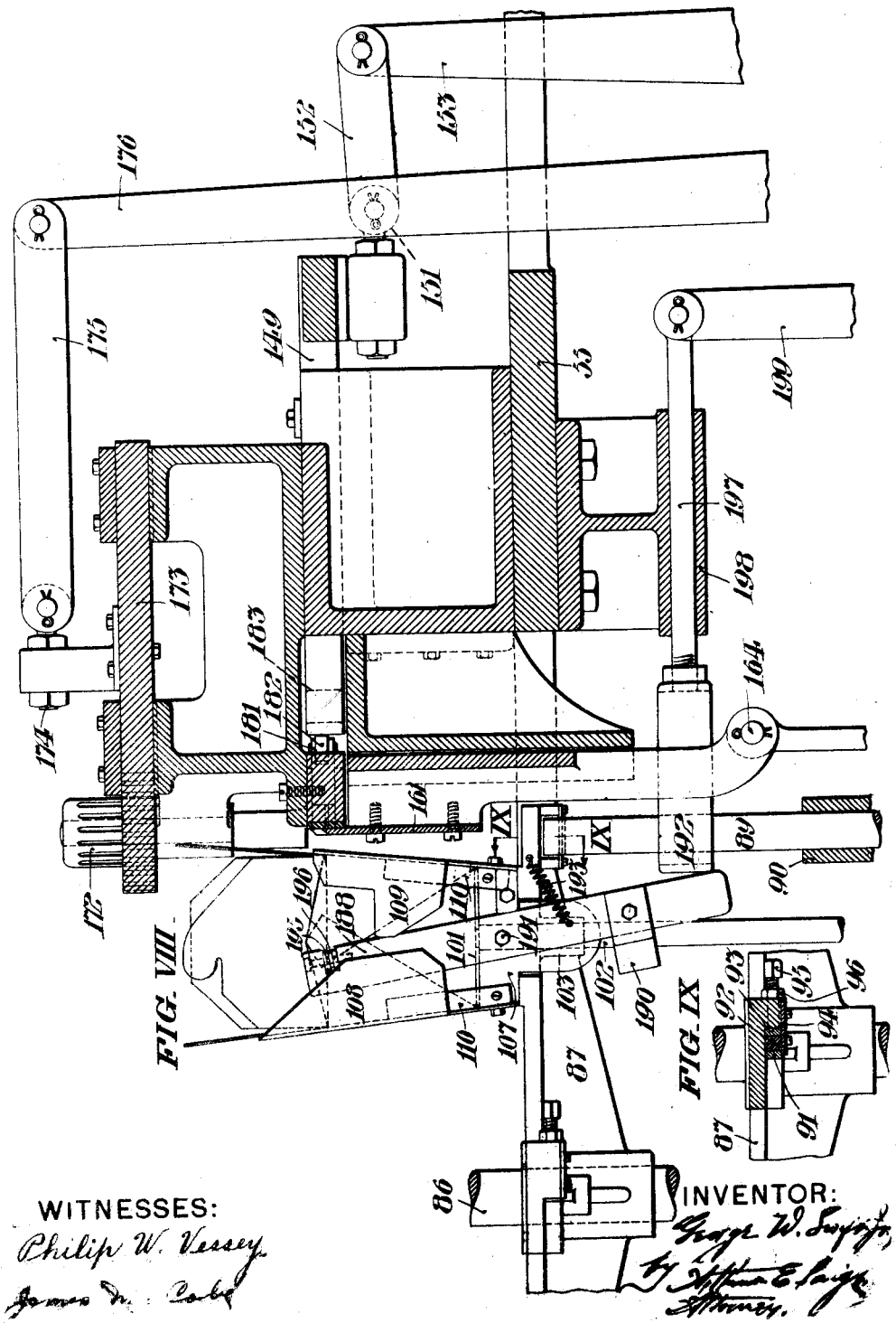

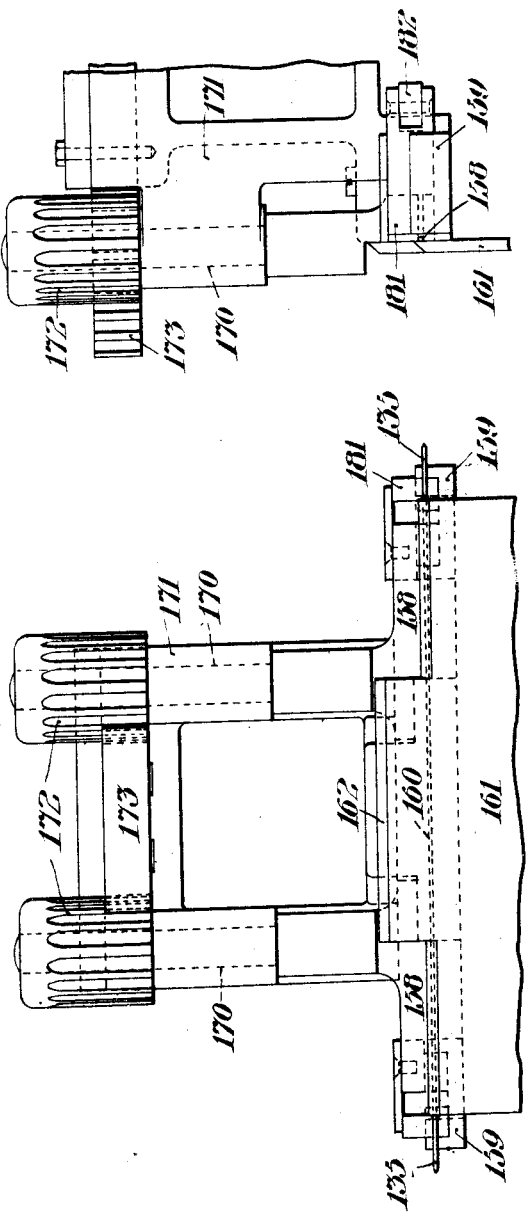

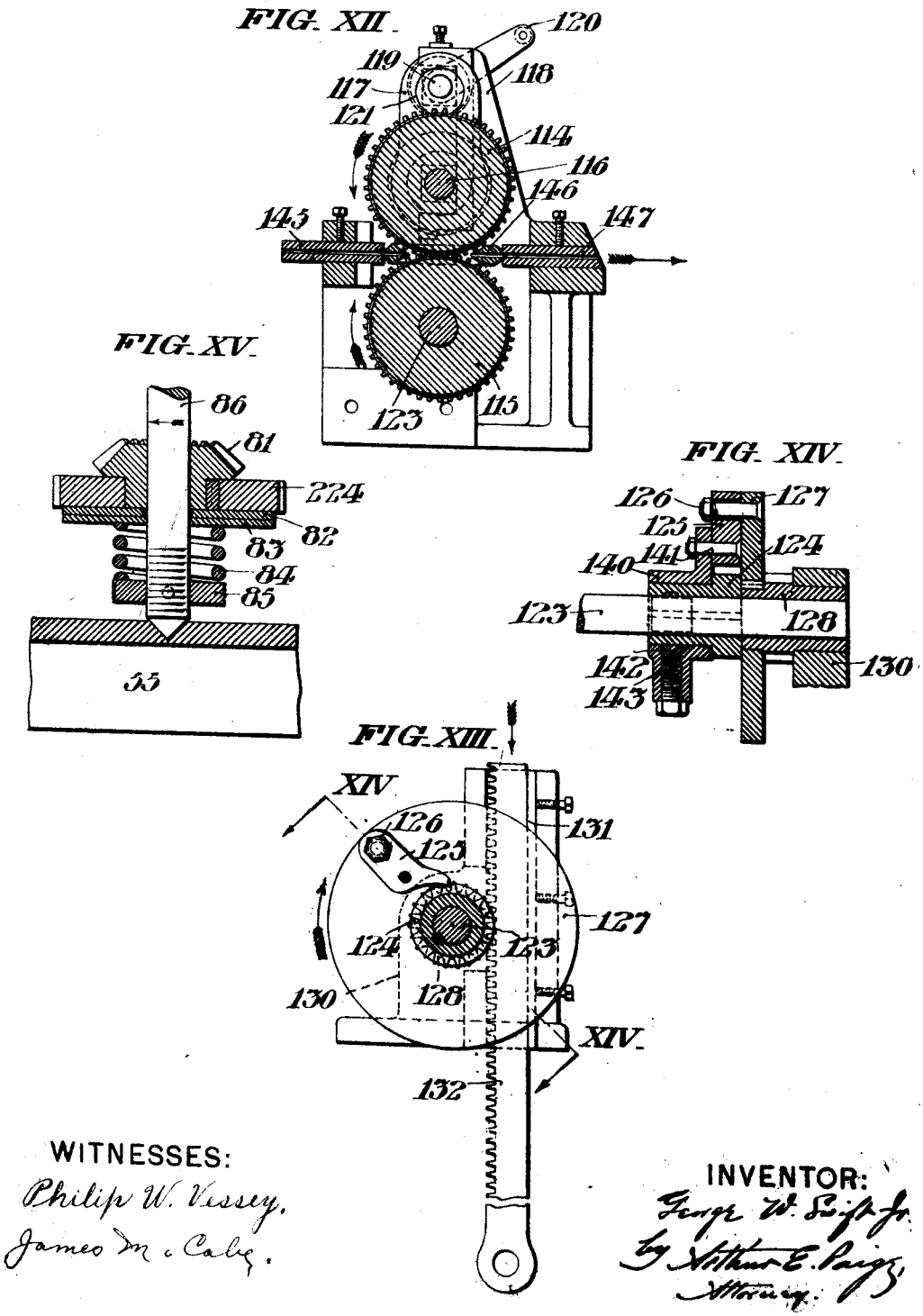

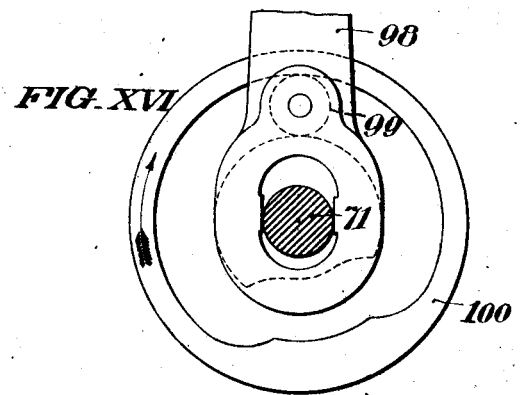
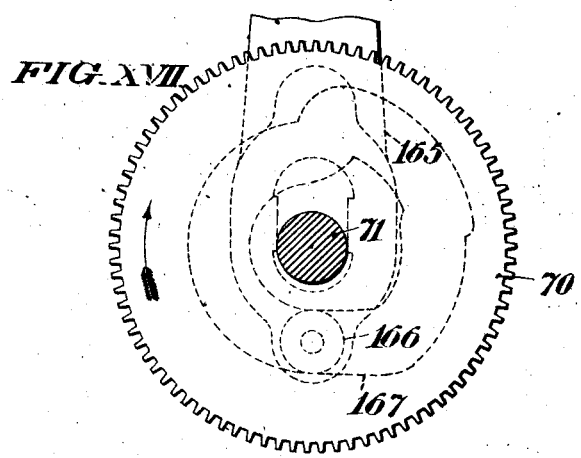
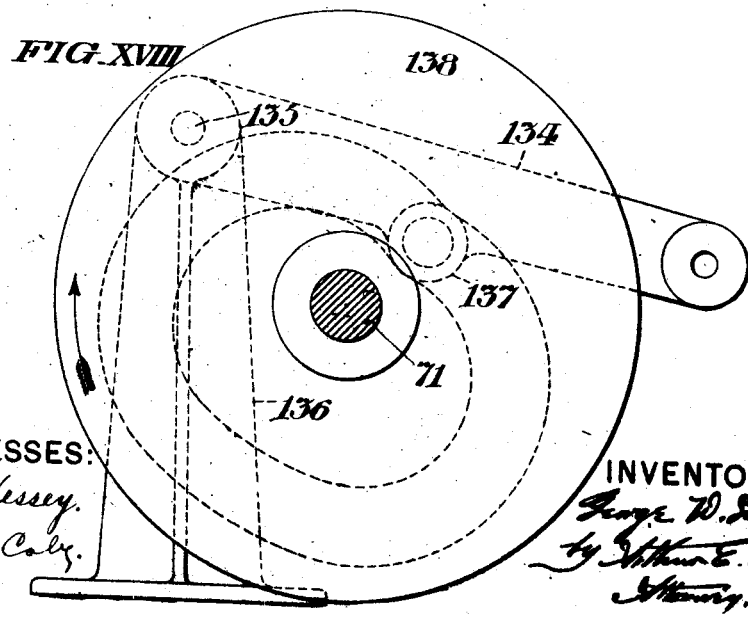

G. W. SWIFT, Jr.
MECHANISM FOR MAKING PAPER RECEPTACLES.
APPLICATION FILED SEPT. 21, 1911.
1,064,563.
Patented June 10, 1913.
13 SHEETS—SHEET 11.
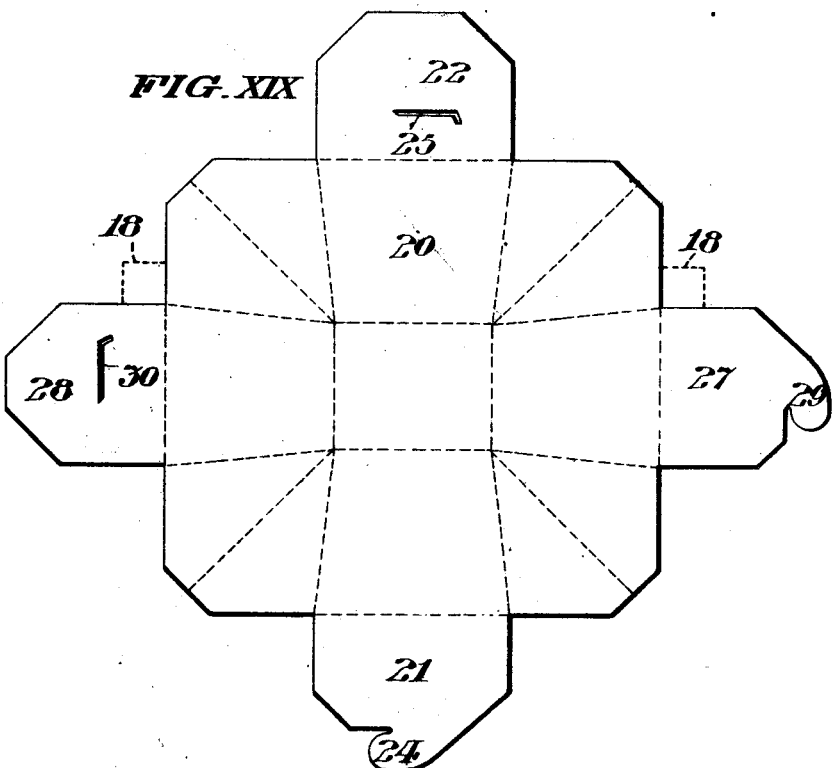
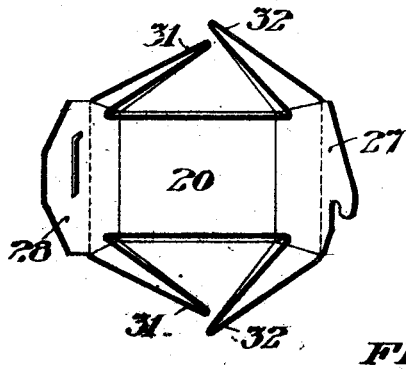
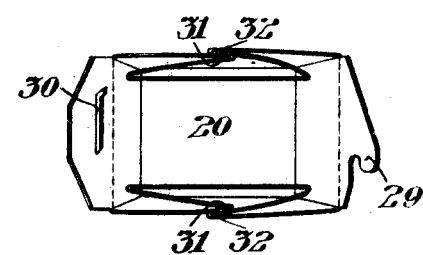
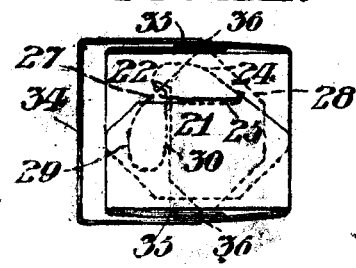
WITNESSES:
Philip W. Vessey
James M. Cole
INVENTOR:
George W. Swift Jr.,
by Arthur E. Paige
Attorney

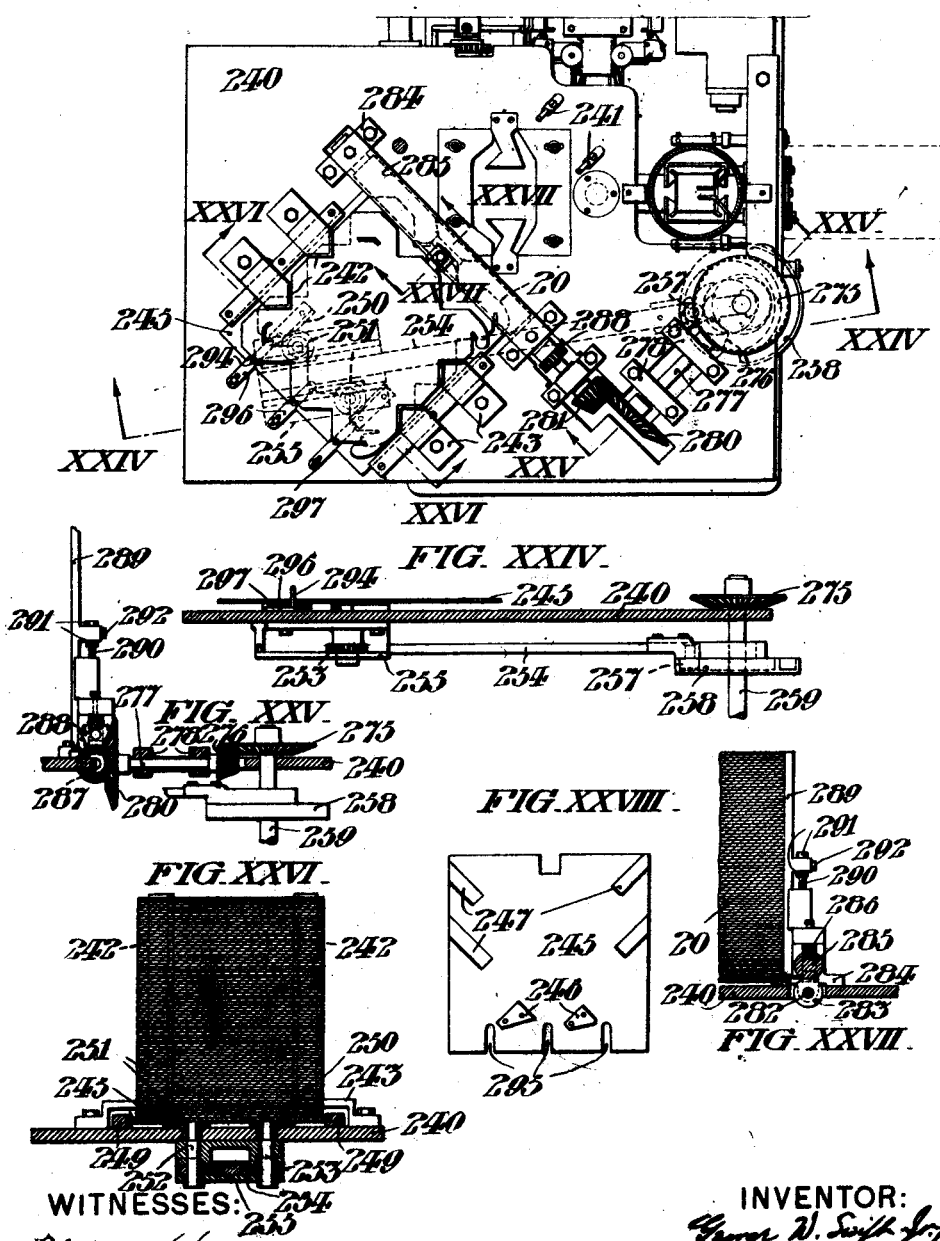

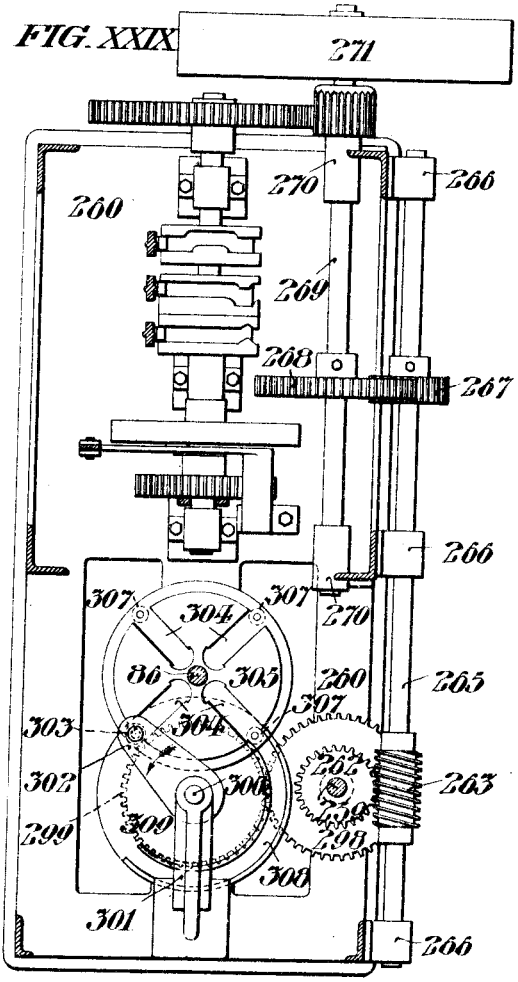
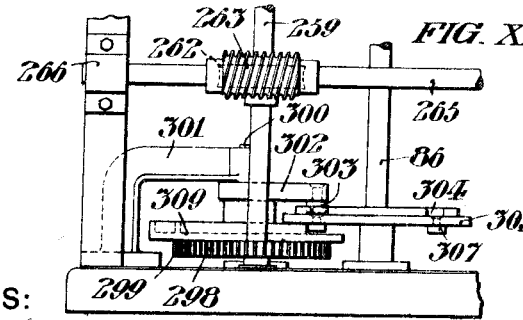

UNITED STATES PATENT OFFICE.

GEORGE W. SWIFT, JR., OF BORDENTOWN, NEW JERSEY.

MECHANISM FOR MAKING PAPER RECEPTACLES.

1,064,563.  Specification of Letters Patent.   Patented June 10, 1913.

Application filed September 21, 1911.  Serial No. 650,492.

*To all whom it may concern:*

Be it known that I, GEORGE W. SWIFT, Jr., of Bordentown, in the State of New Jersey, have invented a certain new and useful improvement in Mechanism for Making Paper Receptacles, whereof the following is a specification, reference being had to the accompanying drawings.

This invention relates to machines for making paper vessels of the class described in Letters Patent of the United States #906,485 dated December 8, 1908, such a vessel being seamlessly formed of a single primarily plane sheet and provided with a wire bail handle having its ends clenched through the folds of the vessel so as to retain the same in the desired shape. It may be noted that in prior mechanism of this general class, the essential elements include pivotally operative means for folding the blanks about a former which is held stationary upon the center of the blank during the folding operation, and, my invention does not include any such pivotal folding means or formers, and, consequently, the construction of such mechanism is not only very much simplified but rendered capable of more rapid and efficient operation.

As hereinafter described, my invention includes a plane table upon which the flat sheet blanks are placed, having an opening through which said sheets are successively pressed by a plunger die, the folding of each sheet to proper form being effected by said horizontal die during the downward movement of the sheet therethrough. Each receptacle thus thrust through the table is received in a holder of which there are four respectively mounted upon radial arms on a rotary carrier by which they are successively presented to mechanism which provides them with the wire bails aforesaid and mechanism which discharges them upwardly from said holder, and, a convenient adjunctive feature of my invention is mechanism for nesting the completed receptacles in succession as they are discharged from the holder and delivering them in a nested series through a suitable conduit.

My invention includes the various novel features of construction and arrangement hereinafter described but it may be here noted that my invention provides means for coupling the diametrically opposite holders on the rotary carrier aforesaid in pairs, so that when either holder of a pair is de- pressed by the descending plunger die in the operation of folding a blank, the opposite holder is automatically raised to discharge the finished receptacle therefrom. Moreover, although the rotary carrier is turned intermittently through an arc of ninety degrees and is then stationary while the folding, bailing and discharging operations are effected, such intermittent movement is effected by continuously rotating means, the latter being connected with said carrier by a friction clutch which permits said carrier to be detained at each quarter turn but instantly progresses it when released. The latter feature is mentioned particularly because its employment in the mechanism hereinafter described permits the latter to operate at a much higher rate of speed than if the driving mechanism for the rotary carrier were connected and disconnected with its driving mechanism.

In the drawings:—Figure I is a plan view of a machine conveniently embodying my invention. Fig. II is a fragmentary plan view of said horizontal die showing the initial position of the paper blank with respect thereto. Fig. III is a front elevation of said machine. Fig. IV is a side elevation of said machine. Figs. V, VI and VII are fragmentary plan views of said machine with the table and die removed, showing respectively different positions of the bailing mechanism. Fig. VIII is a fragmentary vertical sectional view, taken on the line VIII, VIII in Fig. V. Fig. IX is a fragmentary sectional view, taken on the line IX, IX in Fig. VIII, showing the adjustable stop for the rotary carrier. Fig. X is a fragmentary front elevation of a portion of the bailing mechanism. Fig. XI is a side elevation of the mechanism shown in Fig. X. Fig. XII is a vertical sectional view of the wire feeding rollers of the bailing mechanism. Fig. XIII is a fragmentary sectional view showing the driving mechanism for said wire feeding rollers. Fig. XIV is a fragmentary sectional view, taken on the line XIV, XIV in Fig. XIII. Fig. XV is a fragmentary vertical sectional view showing the friction clutch of the rotary carrier driving mechanism. Fig. XVI is a face view of the cam which operates the stop for the rotary carrier. Fig. XVII is an elevation of the cam gear which operates the wire gripping mechanism shown in Fig. X. Fig. XVIII is an elevation of the cam which operates the rack shown in Fig. XIII. Fig.

XIX is a plan view of the receptacle blank. Figs. XX and XXI are plan views of the receptacle showing successive stages in the operation of folding it. Fig. XXII is a plan view of the completed receptacle provided with a bail and closed. It is to be noted that as delivered from the machine said receptacles are open as shown in Fig. XXI. Fig. XXIII is a fragmentary plan view of a modified form of a machine embodying my invention. Fig. XXIV is a vertical sectional view, taken on the line XXIV, XXIV, in Fig. XXIII. Fig. XXV is a fragmentary vertical sectional view, taken on the line XXV, XXV, in Fig. XXIII. Fig. XXVI is a fragmentary vertical sectional view, taken on the line XXVI, XXVI, in Fig. XXIII. Fig. XXVII is a fragmentary vertical sectional view, taken on the line XXVII, XXVII, in Fig. XXIII. Fig. XXVIII is a plan view of the reciprocatory feed plate indicated in Fig. XXIII. Fig. XXIX is a plan sectional view, of the machine indicated in Fig. XXIII, showing the driving mechanism. Fig. XXX is a fragmentary elevation of the right hand side of said machine as indicated in Fig. XXIX.

In said figures; the horizontal plane table 1 is provided with the stationary die comprising the four plates 2, 3, 4 and 5; said plates 2 and 3 being rigidly connected therewith by the screws 6 and 7; and said plates 4 and 5 being adjustably connected with said table by the screws 8 and 9 extending through the respective slots 11 and 12 in said plates. As best shown in Fig. II the four plates of said stationary die are so correlated as to afford a vertical opening 14 therethrough having opposite lateral extensions 15 and 16. Said table 1 is provided with the stationary abutments 18 adjoining said stationary die at respectively opposite sides thereof to determine the proper position of the plane sheet blank 20 with respect to said die; such blanks 20 of paper or other suitable fabric, being successively laid upon said table 1 in the position shown in Fig. II and being successively pressed downward through the aforesaid vertical opening in said stationary die as hereinafter described. As shown in Figs. II and XIX said blank 20 includes an oblong, substantially rectangular body, from which the body of the receptacle is formed, having four cover flaps. The outer cover flaps 21 and 22 extend from the respectively opposite longer sides of said body; said flap 21 having a hook 24 adapted to be engaged in the slot 25 in said flap 22 when said flaps are overlapped in the completed receptacle as shown in Fig. XXII. The inner cover flaps 27 and 28, extend from the shorter sides of said body, the former having the hook 29 adapted to fit in the slot 30 in said flap 28 when said flaps are overlapped in the completed receptacle as indicated in dotted lines in Fig. XXII. The effect of the operation of the machine hereinafter described is to fold said blank 20 so that it passes through the vertical opening 14 in said stationary die in the table 1 in the form shown in Fig. XX; the opposite folded corners 31 passing downward through the extensions 15 in said die opening, shown in Figs. I and II, and, the opposite folded corners 32 passing downward through the extensions 16 in said die opening, so that said folded blanks are successively received in vertically reciprocatory holders, hereinafter described, in the form shown in Fig. XXI, with said corners 32 overlapping the corners 31. Said overlapped corners are permanently connected by the wire bail 34 having its opposite ends 35 clenched through said corner folds so that the portions 36 of said bail form pivots upon which said bail may be oscillated in connection with the receptacle. Such blanks 20 being successively laid upon said table 1 in the position shown in Fig. II and successively pressed downward through the aforesaid vertical opening 14 in said stationary die, by the plunger die 38 best shown in Fig. III; said die being carried by the rod 39 adjustably rigidly secured in the clamp bearing 40 of the arm 41 having at its opposite end the clamp bearing 42 adjustably rigidly mounted upon the plunger 43. Said rod 39 carries the two cross bars 45 in rigid relation therewith provided with vertical bearings for the rods 46 rigidly connected with the roller frame 47 carrying the respectively opposite pairs of rollers 48 and 49 as shown in Fig. I. Said frame 47 normally hangs in such relation to the die 38 as shown in Fig. III upheld by the stop pins 50, extending from the upper ends of said rods 46 resting upon the upper cross bar 45, but, when said die 38 presses the blank 20 through the stationary die opening 14 until said rollers 48 and 49 rest upon said blank 20 said rollers flex the blank flaps outwardly during the further downward movement of said plunger die 38 until the folded blank is thrust entirely through the stationary die opening 14. During such further downward movement of said die 38 said rods 46 slide through their respective bearings in the cross bars 45. During the upward return movement of said plunger 43 said rollers 48 and 49 rest upon the table 1 until the upper cross bar 45 again encounters the pins 50 and lifts said roller frame 47 to the position shown in Fig. III. Said plunger 43 is cylindrical from the top to the point 52 but square in cross section from said point to the bottom of said plunger. Said squared portion is mounted to vertically reciprocate in the similarly shaped bearing 53 in said table 1 and the bearing 54 rigidly connected with the base frame 55. Said plunger 43 is arranged to be vertically reciprocated by the link 57 which is pivotally connected therewith at 58 and pivotally connected at 59 with the crank arm 60 on the shaft 61. Said shaft 61 is journaled in the bearing 62 on the frame standards 63 and is provided with the gear wheel 65 engaging the gear wheel 66 on the shaft 67 journaled in the bearing 68 on said frame standards 63. Said gear 66 is engaged by the gear 70 on the cam shaft 71 which is journaled in the bearings 72 on said base frame 55 and provided at its outer end with the gear wheel 73 engaging the pinion 74 on the main driving shaft 75 which is journaled in the bearings 76 on one of said standards 63. Said shaft 75 is provided with the pulley 78 by which the mechanism above described may be operated. Said cam shaft 71 has at its inner end the bevel gear wheel 80 engaging the gear wheel 81 on the clutch member 82 which is in frictional engagement with the clutch member 83 upheld against it by the spring 84 resting upon the adjustable collar 85 on the vertical shaft 86 of the rotary carrier 87. The arrangement is such that continuous rotation of said cam shaft and its bevel gear 80 tends to continuously rotate said carrier 87 by the frictional engagement of said clutch members 82 and 83, but, the rotation of said carrier 87 may be interrupted while said cam shaft and clutch member 82 continue to rotate. The rotary movement of said carrier 87 is interrupted and said carrier brought to rest at each quarter revolution by detent mechanism including the slide 89 which is mounted to reciprocate in the bearing 90 on the frame as shown in Fig. VIII, so that it may be uplifted to the position shown in said figure to successively encounter four adjustable stops 91 with which the radial arms of said carrier 87 are respectively provided. As shown in Fig. IX said stops 91 are backed by blocks of resilient material 92, for instance, rubber, which are held in operative relation therewith by the block 93; said members 91, 92 and 93 being adjustable upon the support 94 by the set screw 95 which may be secured in adjusted position by the jam nut 96. Said detent slide 89 is operated in proper relation with the other movements of the machine by the cam strap 98 shown in Figs. IV and XVI, which carries the roller 99 engaging the cam 100 on said shaft 71. The four radial arms of said rotary carrier 87 are respectively provided with horizontal holder plates 101 which, as shown in Fig. VIII are respectively provided with vertical stems 102 mounted to reciprocate in bearings 103 in said carrier arms. Said vertically reciprocatory holders in the rotation of said carrier 87 pass in succession in a horizontally circular series beneath said dies, and are successively brought to rest in registry therewith. The diametrically opposite holders in said series are coupled by the yoke levers 105 which are pivotally connected with said stems 102 by the links 106, so that when the holder plate 101 being presented in registry with said dies, immediately beneath the table 1, at the elevation indicated at the left hand side of Fig. IV, is thrust downward by the plunger die 38 pressing the folded blank 20 upon said holder plate, the diametrically opposite holder plate is uplifted to discharge the completed receptacle therefrom. The four holder plates 101 in said series are arranged to reciprocate in respective receptacle guide boxes, each secured in rigid relation with said carrier and conveniently including a cast metal base plate 107 and opposed sheet metal plates 108 and 109; the radially opposite sides of said boxes being downwardly converged as indicated in Fig. VIII and the circumferentially opposite sides thereof being vertically parallel as indicated in Fig. V. Each of said boxes is provided with sheet metal strips 110 secured at their lower ends to said base plate 107 and outwardly diverged into contact with the vertical sides of said boxes. It is to be understood that the construction of said boxes above described, is such that the folded receptacles thrust therein while held between the plunger die 38 and the respective holder plate 101 are frictionally engaged in said boxes by the opposed plates 108, 109 and 110 so that each receptacle thrust into a box in registry with the dies aforesaid; by the next quarter turn of the carrier 87 to the position shown in Fig. VIII, is presented in proper relation with the bailing mechanism.

As shown in Fig. III, the wire 33 for the bail 34 passes into the machine between two sets of straightening rollers 111 and 112 having their axes at right angles to each other and supported in connection with said frame 55. Said wire being straightened by its passage between said rollers passes thence between the feed rolls 114 and 115 shown in section in Fig. XII. Said roll 114 is mounted upon the shaft 116 journaled in the bearing links 117 which are vertically adjustable in the frame bracket 118 such adjustment being effected by the rock shaft 119 provided with the operating handle 120 and having the eccentrics 121 journaled in said links. It is to be understood that by manipulation of said handle 120 said roll 114 may be lowered into operative relation with the roll 115 or be raised into inoperative position. Said roll 115 is positively intermittently rotated by the shaft 123 which is provided with the ratchet clutch mechanism shown in Figs. XIII and XIV; the ratchet 124 which is carried on said shaft having a single tooth adapted to be engaged by the pawl 125 pivotally connected by the stud 126 with the disk 127 which is keyed to the pinion 128 mounted to loosely rotate on said shaft 123 in the frame bracket 130 shown in Figs. V, XIII and XIV. As shown in Fig. XIII said bracket 130 includes a slide bearing 131 for the rack 132 which is engaged with said pinion 128 and is pivotally connected at its lower end by the link 133 with the cam lever 134 shown in Figs. III and IV; said lever being fulcrumed on the stud 135 on the frame bracket 136 and provided with the roller 137 engaging the cam 138 on the cam shaft 71. In order to prevent the momentum of the driving mechanism of said shaft 123 from turning the latter beyond a precisely predetermined limit I provide the brake collar 140 which as shown in Fig. XIV is pivotally connected with said pawl 125 by the stud 141; encircles the hub of said ratchet 124 and has the brake shoe 142 pressed upon the latter by the spring 143. Said spring 143 also maintains said pawl 125 in operative engagement with said ratchet during the reverse movement of said pawl by said rack 132. The wire 33 passes between said feed rolls 114 and 115 through the tubular guides 145, 146 and 147 best shown in Fig. XII, and the precise length for the bail 34 is cut off by the shear blade 148 shown in Fig. V, against the inclined inner end of said guide 147, so as to point the cut wire. The extreme positions of reciprocation of said shear blade 148 with respect to the guide tube 147, are shown respectively in Figs. V and VII. Said wire shear blade 148 is carried by the slide frame 149 which is mounted to reciprocate in the frame bearing 150, being adjustably pivotally connected by the eye bolts 151 and links 152 with the cam lever 153 which is fulcrumed at 154 in the frame and provided at its opposite end with the roller 155 engaging the cam 156 on the shaft 71. Said wire 33 passes from said guide tube 147 through channels 158 in the front faces of the wire bending levers 159 shown in Figs. V, VI, VII, X and XI; said channels in the levers being connected by the intermediate channel 160 in the frame, shown in Fig. X, and, said channels 158 and 160 being closed by the slide 161 during each feeding movement of the wire by the rolls 114 and 115. As shown in Fig. X said slide 161 has the central portion 162 of its upper end which closes the channel 160, extending higher than its lateral portions which close the channels 158, so that the latter may be opened by the downward movement of said slide 161 to permit said levers 159 to bend the wire while the latter is held in the channel 160 by said slide further downward movement of said slide 161 causing said central portion 162 thereof to uncover said channel 160 and permit the wire to be withdrawn therefrom as a completed bail 34. Said slide 161 is connected by the pin 164 with the cam strap 165 shown in Figs. IV and XVII having the roller 166 engaging the cam 167 in the gear 70 whereby said slide is reciprocated as above contemplated. Said wire bending levers 159 have vertical shafts 170 (shown in Figs. X and XI) journaled in the housing 171 and provided at their upper ends with gear pinions 172 engaging the rack 173, which is mounted to reciprocate in said housing as shown in Fig. IV; said slide having the adjustable eye bolt 174 pivotally connected by the links 175 with the cam lever 176 fulcrumed at 177 in the frame and provided at its lower end with the roller 178 engaging the cam 179; whereby said levers 159 are oscillated from the position shown in Fig. V to the position shown in Fig. VII. Said levers 159 carry reciprocatory sectoral slides 181 at their outer ends which are normally retracted behind the channels 158 in said levers as indicated in Fig. V, but have rollers 182 to be encountered by the flanges 183 of the slide 149 so that by the forward movement of said slide said sectors are thrust forward to the position shown in Fig. VI thus initially bending the ends 35 of the wire at right angles to the intermediate portion of said wire; such movement of said sectors being limited by the pins 185 on said sectors which encounter said levers 159 as shown in Fig. VI. Said slide 161 (shown in Figs. X and XI) being then lowered until the lateral portions of its upper end are below the level of said levers 159; the latter are turned from the position shown in Fig. VI to the position shown in Fig. VII, by the movement of said rack 173, so that the portions of said wire extending in the channels 158 in said levers 159 are bent at right angles to the intermediate portion retained by the central portion 162 of said slide 161, and, said pointed ends 35 of the wire, supported by said sectors as indicated in Fig. VI, are thrust through the overlapped folded corners 31 and 32 of the receptacle, said sectors 181 sliding backward in said levers 159 when pressed against the receptacle folds aforesaid and being detained in retracted position by the spring pressed detents 187 until again thrust forward by the movement of said slide 149 after said levers have been returned to the initial position shown in Fig. V, by reverse movement of said rack 173. Each receptacle is thus pivotally connected with a bail having its opposite, axially alined, pointed ends 35 thrust through the opposite overlapped folds thereof, and, said ends are then clenched, as shown in Fig. VII between the inner folds and the adjacent side walls of the receptacle, without penetrating the latter, by bail clenching devices, with which each receptacle holder on the carrier 87 is provided, each including a pair of oscillatory blades 188 rigidly connected by a bar 190, as indicated in Fig. VIII. Said blades being mounted to oscillate on the axially alined studs 191 at opposite sides of the box base 107, are normally tilted against the abutments 192 as shown in Fig. VIII, by the springs 193 connecting them with the carrier 87, so that the ends of said blades, each having a roller 195 with a notch 196 adapted to engage and bend said ends 35 of the bail 34 in the clenching operation, are held out of the way to permit said bail ends 35 to be connected with the receptacle as above described. However, said blades 188 are arranged to be oscillated in proper time to clench said inner ends of the bail, by means of the slide 197 shown in Fig. VIII which is mounted to reciprocate in the bearing 198 on the frame and pivotally connected with the cam lever 199 which is fulcrumed at 200 in said frame, being provided at its opposite end with the roller 201 in engagement with the cam 202 on said cam shaft 71. Upon the completion of the bailing operation aforesaid, said carrier 87 being released by the downward movement of the detent slide 89 said carrier is turned to present the box containing the completed receptacle diametrically opposite to the dies aforesaid, and, said carrier being then detained by the engagement of the slide 89 with the succeeding radial arm of the carrier said completed receptacle is thrust upwardly from the box on said carrier by the upward movement of the holder plate 101 beneath it; said holder plate being uplifted by its coupling lever 105 which is thrust downward at the opposite end by the die 38 pressing another blank 20 through the opening 41 in said stationary die in the table 1. Each completed receptacle being thus uplifted by the vertically reciprocatory holder registers with the lower end of the discharge conduit 205 indicated in Figs. I, III and IV, which as shown in Figs. III and IV has downwardly divergent guide strips 206 at the respectively opposite sides thereof whereby the flaps on the receptacles are directed inwardly so as to pass into said conduit. Each completed receptacle is thereupon engaged by discharging mechanism which retains it in telescopic relation with the preceding discharge receptacles in said conduit, from the upper end of which receptacles are ultimately discharged at a rate determined by the rate of introduction of the receptacles at the lower end of said conduit. The series of nested receptacles thus delivered in registry with said conduit by the reciprocatory holders are upheld in said conduit by opposite pairs of spring fingers 208 provided at their lower ends with tubular rubber tips 209 as indicated in Fig. III. Said fingers are carried by rock shafts 210 and 211 which are journaled in the frame 213 and connected by the sectors 214 and 215, the latter being pivotally connected by the link 216 with the cam lever 217 fulcrumed at 218 on the frame and having the roller 219 engaging the cam 220 on the vertical shaft 221 having the gear 222 engaging the idle gear 223 which engages the gear 224 which is rigidly connected with the clutch member 82 on the shaft 86. It is to be understood that said fingers 208 are separated during the upward movement of each receptacle as it is being added to the series, but close upon and frictionally engage said receptacle immediately upon the reverse movement of the holder plate 101 by which the receptacle has been uplifted. In order to insure that each succeeding receptacle shall fit in telescopic relation with the preceding one in the series in said conduit, I provide another pair of fingers 225 respectively carried by gear pinions 226 upon the stationary frame member 227 engaging the rack 228 pivotally connected by the link 229 with the cam lever 230 fulcrumed at 231 on the frame and having the cam roller 232 engaging the cam 233. As shown in Figs. I and III, the lower ends of said fingers 225 are so bent as to extend within the receptacle which is being uplifted by the subjacent holder 101, but, the operation of said fingers is so timed that they merely open outwardly the subjacent flaps 21 and 22 so as to insure that the latter shall not be caught beneath the last preceding receptacle held by the fingers 208. It may be observed that the opening movement of said fingers 225 is occasioned by the downward movement of said rack 228 and in order to facilitate the upward return movement of said rack, I provide the latter with the cross bar 235 having the vertical rods 236 extending through said frame member 227 and provided above the latter with springs 237 which abut against collars 238 on said rods and tend to uplift the latter and said rack when released by the cam 253.

Figs. XXIII to XXX inclusive show a modified form of my invention including means to automatically feed said blanks 20 one at a time, to the dies aforesaid, from the bottom of a stack of such blanks supported by the horizontal plane table having the stationary die, and, also including driving mechanism arranged to operate said feeding mechanism in connection with means to intermittently turn the carrier and positively detain it at each quarter turn without the employment of the spring stop mechanism above described. As shown in Figs. XXIII, XXVI and XXVII the table 240 is provided with the stationary die as above described, but in lieu of the abutments 18 said table 240 is provided with the stops 241 adjoining said die, and, a stack holder including opposite vertical angle bars 242 having brackets 243 at their lower ends connecting them with said table; said bars being spaced to hold a stack of said blanks 20 between them. The reciprocatory feed plate 245, best shown in Fig. XXVIII, extends between the lower ends of said bars 242 and the top of said table 240, being arranged to support said stack which gravitates thereon, and having abutments 246 and 247 upon its upper surface arranged to engage and carry only the bottom blank in said stack, when said plate is moved toward said die; said plate and the bottom ends of said bars 242 being so spaced as to permit the passage of but a single blank 20 between them. Said feed plate 245 is mounted to reciprocate in the bearings 249 on said table 240 and has the gear racks 250 engaging the gears 251 by which it is reciprocated. Said gears 251 are mounted upon the upper ends of the shafts 252 shown in Fig. XXVI, having at the lower ends thereof the gears 253 engaging the rack 254 which reciprocates on the bearing 255 rigidly connected with said table 240. Said rack 254 is reciprocated by the engagement of its roller 257 in the cam 258 on the vertical shaft 259 which is journaled in the frame 260, and arranged to be continuously rotated by the engagement of its gear 262 with the worm 263 on the horizontal shaft 265 which is journaled in the bearings 266 on said frame 260, and has the gear 267 engaging the gear 268 on the main driving shaft 269 which is journaled in the bearings 270 on said frame 260, and provided exterior thereto with the pulley 271 similar to the pulley 72 above described. It may be observed that said shaft 269 is the equivalent of the shaft 75 shown in Fig. I, and is similarly operatively connected with a cam shaft extending parallel thereto and provided with cams and adjunctive means arranged to operate the reciprocatory plunger die and bailing mechanism above described. As shown in Figs. XXIII, XXIV and XXV said vertical shaft 259 has the bevel gear 275 at the top thereof engaging the bevel gear 276 on the horizontal shaft 277 which is journaled in the bearings 278 on said table 240, and has the bevel gear 280 engaging the bevel gear 281 on the shaft 282 of the feed roller 283 which is journaled in the bearing brackets 284 on said table 240 beneath the feed roller 285; the latter being pressed into operative relation with the roller 283 by the springs 286 shown in Fig. XXVII. Said feed roller 283 has the gear 287 engaging the gear 288 on the roller 285 to positively drive the latter. Said feed rollers being continuously rotated in definite relation to the reciprocatory movements of said plunger die and said feed plate 245, catch the blanks 20 as they are successively presented by said plate and feed them into proper relation with the stationary die on said table 240 against said stops 241 shown in Fig. XXIII. The feeding movement of more than one of said blanks 20 at a time is prevented by the vertical gate bar 289 of said stack holder, which is arranged to be raised and lowered in said bracket 284 and may be vertically adjusted by the screw 290 and secured in adjusted position by the nuts 291 and set screws 292 shown in Figs. XXV and XXVII, so as to afford passage for single blanks 20 of different thicknesses beneath it. The outward return movement of said feed plate 245 in frictional contact with the bottom blank in said stack of course tends to displace said bottom blank outward. Therefore, I find it convenient to prevent such accidental displacement of the bottom blank in the stack by vertical pins 294, which extend in the notches 295 in the outer edge of said plate, from base plates 296 which are slotted for adjustment in the direction of the movement of said plate in connection with bolts 297 by which they are secured to said table 240. I find it desirable to positively intermittently operate said rotary carrier shaft 86, without the employment of the friction clutch shown in Fig. XV, or the adjustable stop mechanism shown in Fig. IX; as follows:—As shown in Figs. XXIX and XXX, said shaft 259 is provided with the gear 298 engaging the gear 299 on the shaft 300 journaled in the frame bracket 301 and carrying the continuously rotary driving member including the crank arm 302 having the wrist pin roller 303 arranged to successively engage the four radial slots 304 in the intermittently driven member including the disk 305 fixed on said rotary carrier shaft 86; so that by the continuous rotation of said crank 502 said disk 305 is automatically engaged and released by said roller 303, being thus intermittently turned quarter revolutions and left in the position shown in Fig. XXIX, with the holders 101 carried by said shaft 86 presented in the successive positions of registration with the reciprocatory plunger die, bailing mechanism, etc., as above described. In order to stop and hold said disk 305 stationary after each quarter turn, I provide stop mechanism including the four rollers 307 on said disk, and the channel 308 of the stop disk 309 which is carried by said gear 301 in rigid relation with said crank 302, so as to successively engage said rollers 307.

The last described carrier driving mechanism is preferable, in that it may be operated at a much higher rate of speed; the carrier being positively turned and stopped without the successive shocks incident to the employment of the automatic stop mechanism shown in Fig. IX.

Although I find it convenient to provide the discharge conduit 205 and the discharging mechanism described, it is to be understood that I do not desire to limit myself to such construction. Moreover, it is to be understood that any suitable bailing mechanism may be employed in coöperative relation with the dies and rotary carrier above described. Therefore, I do not desire to limit myself to the particular construction and arrangement of the machine herein set forth as various modifications may be made therein without departing from the essential features of my invention as defined in the appended claims.

I claim:—

1. In mechanism of the class described, a horizontal plane table having a stationary die with a vertical opening therethrough; a plunger die mounted to vertically reciprocate above said stationary die and to fold a plane sheet blank to form a receptacle by pressing it downward from said table through said stationary die; vertically reciprocatory holders arranged in a horizontally circular series beneath said dies, adapted to successively receive the folded receptacles; means coupling the diametrically opposite holders in said series, whereby, depression of one by said plunger die raises the other, to discharge the receptacle from the latter; a carrier rotary upon a vertical axis supporting said holders; means arranged to turn said carrier, including a rotary driving member; stop mechanism arranged to detain said carrier at each quarter turn of the latter, during the continued rotation of said driving member; wire bailing mechanism arranged to successively coöperate with each holder to provide the receptacle therein with a swing bail clenched through the folds of said receptacle; discharging mechanism for said receptacles arranged to coöperate with said holders when the latter are raised; said plunger die, bailing mechanism and discharging mechanism being arranged to operate upon said receptacles at respective quadratic positions of the latter; a discharge conduit arranged to register with said holders in the discharging position of the latter; and, means arranged to successively nest said receptacles in said conduit.

2. In mechanism of the class described, a horizontal plane table having a stationary die with a vertical opening therethrough; a plunger die mounted to vertically reciprocate above said stationary die and to fold a plane sheet blank to form a receptacle by pressing it downward from said table through said stationary die; vertically reciprocatory holders arranged in a horizontally circular series beneath said dies, adapted to successively receive the folded receptacles; means coupling the diametrically opposite holders in said series, whereby, depression of one by said plunger die raises the other, to discharge the receptacle from the latter; a carrier rotary upon a vertical axis supporting said holders; means arranged to turn said carrier, including a rotary driving member; stop mechanism arranged to detain said carrier at each quarter turn of the latter, during the continued rotation of said driving member; wire bailing mechanism arranged to successively coöperate with each holder to provide the receptacle therein with a swing bail clenched through the folds of said receptacle; and, discharging mechanism for said receptacles arranged to coöperate with said holders when the latter are raised; said plunger die, bailing mechanism and discharging mechanism being arranged to operate upon said receptacles at respective quadratic positions of the latter.

3. In mechanism of the class described, a horizontal plane table having a stationary die with a vertical opening therethrough; a plunger die mounted to vertically reciprocate above said stationary die and to fold a plane sheet blank to form a receptacle by pressing it downward from said table through said stationary die; vertically reciprocatory holders arranged in a horizontally circular series beneath said dies, adapted to successively receive the folded receptacles; means coupling the diametrically opposite holders in said series, whereby, depression of one by said plunger die raises the other, to discharge the receptacle from the latter; a carrier rotary upon a vertical axis supporting said holders; means arranged to turn said carrier, including a rotary driving member; stop mechanism arranged to detain said carrier at each quarter turn of the latter, during the continued rotation of said driving member; wire bailing mechanism arranged to successively coöperate with each holder to provide the receptacle therein with a swing bail clenched through the folds of said receptacle; and, said plunger die, bailing mechanism and discharging mechanism being arranged to operate upon said receptacles at respective quadratic positions of the latter.

4. In mechanism of the class described, a horizontal plane table having a stationary die with a vertical opening therethrough; a plunger die mounted to vertically reciprocate above said stationary die and to fold a plane sheet blank to form a receptacle by pressing it downward from said table through said stationary die; vertically reciprocatory holders arranged in a horizontally circular series beneath said dies, adapted to successively receive the folded receptacles; means coupling the diametrically opposite holders in said series, whereby, depression of one by said plunger die raises the other, to discharge the receptacle from the latter; a carrier rotary upon a vertical axis supporting said holders; means arranged turn said carrier, including a rotary driving member; stop mechanism arranged to detain said carrier at each quarter turn of the latter; discharging mechanism for said receptacles arranged to coöperate with said holders when the latter are raised; said plunger die, and discharging mechanism being arranged to operate upon said receptacles at different positions of the latter; a discharge conduit arranged to register with said holders in the discharging position of the latter; and, means arranged to successively nest said receptacles in said conduit.

5. In mechanism of the class described, a horizontal plane table having a stationary die with a vertical opening therethrough; a plunger die mounted to vertically reciprocate above said stationary die and to fold a plane sheet blank to form a receptacle by pressing it downward from said table through said stationary die; vertically reciprocatory holders arranged in a horizontally circular series beneath said dies, adapted to successively receive the folded receptacles; means coupling the diametrically opposite holders in said series, whereby, depression of one by said plunger die raises the other, to discharge the receptacle from the latter; a carrier rotary upon a vertical axis supporting said holders; means arranged to turn said carrier, including a rotary driving member; stop mechanism arranged to detain said carrier at each quarter turn of the latter; and, discharging mechanism for said receptacles arranged to coöperate with said holders when the latter are raised; said plunger die, and discharging mechanism being arranged to operate upon said receptacles at different positions of the latter.

6. In mechanism of the class described, a horizontal plane table having a stationary die with a vertical opening therethrough; a plunger die mounted to vertically reciprocate above said stationary die and to fold a plane sheet blank to form a receptacle by pressing it downward from said table through said stationary die; vertically reciprocatory holders arranged in a horizontally circular series beneath said dies, adapted to successively receive the folded receptacles; means coupling the diametrically opposite holders in said series, whereby, depression of one by said plunger die raises the other, to discharge the receptacle from the latter; a carrier rotary upon a vertical axis supporting said holders; means arranged to turn said carrier; stop mechanism arranged to detain said carrier at each quarter turn of the latter; wire bailing mechanism arranged to successively coöperate with each holder to provide the receptacle therein with a swing bail; said plunger die, and discharging mechanism being arranged to operate upon said receptacles at different positions of the latter.

7. In mechanism of the class described, a plane table having a stationary die with a vertical opening therethrough; a plunger die mounted to reciprocate with respect to said stationary die and to fold a plane sheet blank to form a receptacle by pressing it from said table through said stationary die; reciprocatory holders arranged in a circular series, adapted to successively receive the folded receptacles; means coupling the diametrically opposite holders in said series, whereby, movement of one by said plunger die moves the other, to discharge the receptacle from the latter; a rotary carrier supporting said holders; means arranged to turn said carrier, including a rotary driving member; stop mechanism arranged to detain said carrier at each quarter turn of the latter during the continued rotation of said driving member; wire bailing mechanism arranged to successively coöperate with each holder to provide the receptacle therein with a swing bail; and, discharging mechanism for said receptacles arranged to coöperate with said holders; said plunger die, bailing mechanism and discharging mechanism being arranged to operate upon said receptacles at respective quadratic positions of the latter.

8. In mechanism of the class described, a plane table having a stationary die with a vertical opening therethrough; a plunger die mounted to reciprocate with respect to said stationary die and to fold a plane sheet blank to form a receptacle by pressing it from said table through said stationary die; reciprocatory holders arranged in a circular series, adapted to successively receive the folded receptacles; means coupling the diametrically opposite holders in said series, whereby, movement of one by said plunger dies moves the other, to discharge the receptacle from the latter; a rotary carrier supporting said holders; means arranged to turn said carrier, including a rotary driving member; stop mechanism arranged to detain said carrier at each quarter turn of the latter during the continued rotation of said driving member; wire bailing mechanism arranged to successively coöperate with each holder to provide the receptacle therein with a swing bail; and, discharging mechanism for said receptacles arranged to coöperate with said holders.

9. In mechanism of the class described, a stationary die; a plunger die; reciprocatory holders arranged in a circular series, adapted to successively receive folded receptacles from said dies; means coupling the diametrically opposite holders in said series, whereby, movement of one by said plunger die moves the other, to discharge the receptacle from the latter; a rotary carrier supporting said holders; means arranged to turn said carrier, including a rotary driving member; stop mechanism arranged to detain said carrier at each quarter turn of the latter during the continued rotation of said driving member; wire bailing mechanism arranged to successively coöperate with each holder to provide the receptacle therein with a swing bail clenched through the folds of said receptacle; and, discharging mechanism for said receptacles arranged to coöperate with said holders.

10. In mechanism of the class described, a stationary die; a plunger die; reciprocatory holders arranged in a circular series, adapted to successively receive folded receptacles from said dies; means coupling the diametrically opposite holders in said series, whereby, movement of one by said plunger die moves the other, to discharge the receptacle from the latter; a rotary carrier supporting said holders; means arranged to turn said carrier, including a rotary driving member; stop mechanism arranged to detain said carrier at each quarter turn of the latter during the continued rotation of said driving member; wire bailing mechanism arranged to successively coöperate with each holder to provide the receptacle therein with a swing bail; discharging mechanism for said receptacles arranged to coöperate with said holders; said plunger die, bailing mechanism and discharging mechanism being arranged to operate upon said receptacles at respective quadratic positions of the latter.

11. In mechanism of the class described, a stationary die; a plunger die; reciprocatory holders arranged in a circular series, adapted to successively receive folded receptacles from said dies; means coupling the diametrically opposite holders in said series; whereby, movement of one by said plunger die moves the other, to discharge the receptacle from the latter; a rotary carrier supporting said holders; means arranged to turn said carrier; stop mechanism arranged to detain said carrier at each quarter turn of the latter; wire bailing mechanism arranged to successively coöperate with each holder to provide the receptacle therein with a swing bail; discharging mechanism for said receptacles arranged to coöperate with said holders; said plunger die, bailing mechanism and discharging mechanism being arranged to operate upon said receptacles at respective quadratic positions of the latter.

12. In mechanism of the class described, the combination with a reciprocatory receptacle holder; of a conduit in registry with said holder; receptacle nesting mechanism including opposite fingers arranged to open receptacles in alinement with said conduit; and, means arranged to oscillate said fingers in coöperative relation; whereby, the ends of said fingers are moved away from each other within said receptacles, in succession.

13. In mechanism of the class described, the combination with a reciprocatory receptacle holder; of receptacle nesting mechanism including opposed fingers arranged to close upon receptacles presented by said holder; opposite fingers arranged to open said receptacles; and, means arranged to oscillate said fingers in coöperative relation; whereby, the ends of said fingers which engage said receptacles are alternately moved toward and away from each other.

14. In mechanism of the class described, the combination with a reciprocatory receptacle holder; of receptacle nesting mechanism including opposite fingers arranged to open receptacles presented by said holder; and, means arranged to oscillate said fingers in coöperative relation; whereby, the ends of said fingers which engage said receptacles are alternately moved toward and away from each other.

15. In mechanism of the class described, the combination with a receptacle holder; of receptacle nesting mechanism including opposed fingers arranged to close upon receptacles presented by said holder; opposite fingers arranged to open said receptacles; and, means arranged to oscillate said fingers in coöperative relation; whereby, the ends of said fingers which engage said receptacles are alternately moved toward and away from each other.

16. In mechanism of the class described, the combination with a receptacle holder; of receptacle nesting mechanism including opposed fingers arranged to close upon receptacles presented by said holder; and, means arranged to oscillate said fingers in coöperative relation; whereby, the ends of said fingers which engage said receptacles are alternately moved toward and away from each other.

17. In mechanism of the class described, the combination with a receptacle holder; of receptacle nesting mechanism including opposite fingers arranged to open receptacles presented by said holder; and, means arranged to oscillate said fingers in coöperative relation; whereby, the ends of said fingers which engage said receptacles are alternately moved toward and away from each other.

18. In mechanism of the class described, the combination with a receptacle holder; of receptacle nesting mechanism including a finger arranged to close upon receptacles presented by said holder; a finger arranged to open said receptacles; and, means arranged to oscillate said fingers in coöperative relation; whereby, said fingers are alternately moved toward and away from the middle of each receptacle.

19. In mechanism of the class described, the combination with a receptacle holder; of receptacle nesting mechanism including a finger arranged to open receptacles presented by said holder; and, means arranged to oscillate said finger; whereby, said finger is alternately moved toward and away from the middle of each of said receptacles.

20. In mechanism of the class described, the combination with a receptacle holder; of a finger arranged to open receptacles presented by said holder; and, means arranged to actuate said finger in coöperative relation with said holder; whereby, said finger is alternately moved toward and away from the middle of each of said receptacles.

21. In mechanism of the class described, a plane table having a stationary die with a vertical opening therethrough; a plunger die mounted to reciprocate with respect to said stationary die and to fold a plane sheet blank to form a receptacle by pressing it from said table through said stationary die; reciprocatory holders arranged in a circular series, adapted to successively receive the folded receptacles; means coupling the diametrically opposite holders in said series, whereby, movement of one by said plunger die moves the other, to discharge the receptacle from the latter; a rotary carrier supporting said holders; means arranged to turn said carrier, including a rotary driving member; stop mechanism arranged to detain said carrier at each quarter turn of the latter during the continued rotation of said driving member; wire bailing mechanism arranged to successively coöperate with each holder to provide the receptacle therein with a swing bail; and, means distinct from said coupling means, arranged to facilitate the discharge of the receptacles from said holders.

22. In mechanism of the class described, a plane table having a stationary die with a vertical opening therethrough; a plunger die mounted to reciprocate with respect to said stationary die and to fold a plane sheet blank to form a receptacle by pressing it from said table through said stationary die; reciprocatory holders arranged in a circular series, adapted to successively receive the folded receptacles; means coupling the diametrically opposite holders in said series, whereby, movement of one by said plunger die moves the other, to discharge the receptacle from the latter; a rotary carrier supporting said holders; means arranged to turn said carrier, including a rotary driving member; stop mechanism arranged to detain said carrier at each quarter turn of the latter during the continued rotation of said driving member; and, wire bailing mechanism arranged to successively coöperate with each holder to provide the receptacle therein with a swing bail.

In testimony whereof, I have hereunto signed my name at Bordentown, New Jersey, this fifteenth day of September, 1911.

GEORGE W. SWIFT, Jr.

Witnesses:
 WALTER L. REEDER,
 HAROLD B. WILLS.

Corrections in Letters Patent No. 1,064,563.

It is hereby certified that in Letters Patent No. 1,064,563, granted June 10, 1913, upon the application of George W. Swift, Jr., of Bordentown, New Jersey, for an improvement in "Mechanism for Making Paper Receptacles," errors appear in the printed specification requiring correction as follows: Page 1, line 63, before the word "stationary" insert the word *held;* page 2, line 58, for the article "a" read *the;* page 3, line 100, for the word "plate" read *plates;* page 8, line 114, for the word "dies" read *die;* and page 10, name of second-mentioned witness to signature of specification, for "Harold B. Wills" read *Harold B. Wells;* and that the said Letters Patent should be read with these corrections therein that the same may conform to the record of the case in the Patent Office.

Signed and sealed this 24th day of June, A. D., 1913.

[SEAL.]

C. C. BILLINGS,
*Acting Commissioner of Patents.*